United States Patent [19]
Lo et al.

[11] Patent Number: 6,016,124
[45] Date of Patent: Jan. 18, 2000

[54] DIGITAL BEAMFORMING IN A SATELLITE COMMUNICATION SYSTEM

[75] Inventors: Wing Lo; Jue Chang, both of Plano, Tex.

[73] Assignee: Nortel Networks Corporation, Richardson, Tex.

[21] Appl. No.: 09/055,374

[22] Filed: Apr. 6, 1998

Related U.S. Application Data

[60] Provisional application No. 60/042,797, Apr. 7, 1997.

[51] Int. Cl.[7] .................................................. H01Q 3/26
[52] U.S. Cl. ............................................................ 342/373
[58] Field of Search .................................... 342/354, 373; 370/335, 342, 441, 479, 916

[56] References Cited

U.S. PATENT DOCUMENTS

| | | |
|---|---|---|
| 4,879,711 | 11/1989 | Rosen . |
| 5,115,248 | 5/1992 | Roederer . |
| 5,132,694 | 7/1992 | Sreenivas ................................ 342/373 |
| 5,572,216 | 11/1996 | Weinberg et al. . |
| 5,831,977 | 11/1998 | Dent ........................................ 370/335 |

*Primary Examiner*—Thomas H. Tarcza
*Assistant Examiner*—Dao L. Phan
*Attorney, Agent, or Firm*—John D. Crane

[57] ABSTRACT

A plurality of bit stream formatters formats and codes the digital information signals that are to be transmitted. A symbol generator generates I and Q symbols from the formatted information signals. These symbols are input to the beamforming matrix that is connected directly to the symbol generators. The beamforming matrix generates baseband beam signals from the I and Q symbols. Baseband, pulse-shaping, low-pass filters are connected to the beamforming matrix. The low-pass filters each generate an antenna feed signal from each of the baseband beam signals.

3 Claims, 4 Drawing Sheets

 …

DIGITAL BEAMFORMING IN A SATELLITE COMMUNICATION SYSTEM

RELATED APPLICATIONS

This is a 35 U.S.C. § 111(a) application of provisional U.S. patent application Ser. No. 60/042,797, filed Apr. 7, 1997.

BACKGROUND OF THE INVENTION

I. Field of the Invention

The present invention relates to satellite communications. More particularly, the present invention relates to beamforming in a satellite communication system.

II. Description of the Related Art

Fundamentals of Beamforming

The term beamforming relates to the function performed by a device in which energy radiated by an aperture antenna is focused along a specific direction in space. The objective is either preferentially receiving a signal from a particular direction or preferentially transmitting a signal in a particular direction.

For example, in a parabolic antenna system, the dish is the beamforming network since it takes the energy that lies within the aperture formed by the perimeter of the dish and focuses it onto the antenna feed. The dish and feed operate as a spatial integrator.

FIG. 1 is a diagram of a prior art, multi-beamforming, satellite communication network. In FIG. 1, ground gateway station (100) sends a combined voice and data signal (102) via the RF feeder link to the satellite (106). This signal is received by a multibeam antenna on the satellite and then transmitted to the beams within the footprint via the RF terminal links (108, 112, and 114). The part of the signal that corresponds to a particular beam is routed to that beam. Each beam corresponds to a specific frequency range that depends on the total bandwidth, channel bandwidth, and reuse factors.

Energy from a far-field source, which is assumed to be aligned with the antenna's preferred direction, arrives at the feed temporarily aligned and is summed coherently. In general, sources in other directions arrive at the feed unaligned and are added incoherently. For this reason, beamforming is often referred to as spatial filtering.

Beamforming may also be carried out using phased-array antennas. An array can be considered as a sampled aperture. When an array is illuminated by a source, samples of the source's wavefront are recorded at the location of the antenna elements.

The outputs from antenna elements may be subjected to various forms of signal processing. In these cases, phase or amplitude adjustments are made to produce outputs that provide concurrent angular information for signals arriving from several different directions in space. When the outputs of the elements of an array are combined via some passive phasing network, the phasing will usually arrange for the output of all the elements to add coherently for a given direction. If information were desired regarding signals arriving from a different region in space, another phasing network would have to be implemented.

The network that controls the phases and amplitudes of the excitation current is typically called the beamforming network. If beamforming is carried out at a radio frequency (RF), the analog beamforming network typically consists of devices such as phase shifters and power dividers that adjust the amplitudes and phases of the elemental signals to form a desired beam. The beamforming network can be implemented using microwave lenses, waveguides, transmission lines, printed microwave circuits, and hybrids.

It is sometimes desirable to form multiple beams that are offset by finite angles from each other. The design of a multiple-beam beamforming network, known as a beamforming matrix, is much more complicated than that of a single-beam, beamforming network. In a beamforming matrix, an array of hybrid junctions and fixed-phase shifters are used to achieve desired results.

Beamforming can be performed either on the ground or on the satellite. There are several advantages with having beamforming performed on the ground. A ground beamforming system releases some satellite load while allowing more beamformers to be placed on the ground than could be placed in a satellite. Another advantage is that a beamformer on the ground provides more flexibility for future tuning and modification if a failure or error occurs. Also, the number of ground-based beamformers can be increased if the need arises. This option is not available if the satellite has already been launched.

FIG. 2 illustrates a block diagram of a prior art system using ground-based beamforming. The beamforming network can be implemented by either analog or digital circuits.

In the ground based beamforming network (200), multiple ground radio transmitters (202–204) send beam signals to the beamforming network (206) that are designated to particular beams. The beamforming network (206) manipulates these beam signals into feed RF signals (208) that are routed to the multiplexer (210). The multiplexer combines the multiple feed input to a single information stream.

This information stream is input to a feeder RF front-end module (212). The feeder RF front-end (212) converts the signals to the proper RF frequency for transmission by the ground based antenna (214).

The signals are transmitted from the ground based beamforming network (200) to the space segment (220) over the feeder link (216). The space-based feed link antenna (218) receives the multiplexed signal.

The receiver RF front-end band-pass filters the antenna signal and preamplifies the signal using low noise amplifiers. The signals are preamplified to a required signal strength.

The signals from the RF front-end (225) are input to the demultiplexer (235). The demultiplexer (235) breaks out the individual feed signals that were multiplexed during the ground processing for transmission via the feeder link. Each feed signal is input to the frequency conversion section (240) where each signal is converted with a common local oscillator signal. The resulting frequency converted signals are input to the multi-beam/multi-feed antenna array (250) for transmission to the earth.

Signals radiated from multiple feeds will form beams pointing to different directions based upon the phase relationship between coherent signals at the phased array. These beams are directed to cover the service area on earth through a frequency reuse plan.

Multiple ground gateway stations are used to provide connectivity from the satellite network to the ground communications network. This eliminates the single point of failure and provides a local landing point to reduce use of long distance ground transmission facilities.

In the case of the multi-feed/multi-beam beamforming systems, it is well known in the art that all signals go to antenna feeds that form a common set of beams that must be coherent. In other words, those feed signals must be beamformed from the same ground gateway station. This places a restriction on the beamforming system that all the beams formed for one particular frequency band must come from a single ground gateway.

Fundamentals of Digital Beamforming

Beamforming functions can be achieved in the digital domain, especially when the original signal is in digital form (e.g., signals from a digital radio). Digital Beamforming is a combination of antenna technology and digital technology. A generic, digital beamforming antenna system is comprised of three major components: an antenna array, a digital transceiver, and a digital signal processor (DSP).

In a digital beamforming antenna system, the received signals are digitized at the element level. Digital beamforming is based on capturing the radio frequency (RF) signals at each of the antenna elements and converting them into two streams of binary baseband signals known as the in-phase (I) and quadrature-phase (Q) channels.

Included within the digital baseband signals are the amplitudes and phases of signals received at each element of the array. The beamforming is accomplished by weighting these digital signals, thereby adjusting their amplitudes and phases, such that when added together they form the desired beam. This function, usually performed using an analog beamforming network, can be done by a special purpose DSP.

The key to this technology is that the receivers must all be closely matched in amplitude and phase. A calibration process that adjusts the values of the data stream prior to beamforming accomplishes the matching.

One advantage of digital beamforming over conventional phased arrays is the greatly added flexibility without any attendant degradation in the signal-to-noise ratio (SNR). Additional advantages include:

(a) Beams can be assigned to individual users, thereby assuring that all links operate with maximum gain;

(b) Adaptive beamforming can be easily implemented to improve the system capacity by suppressing co-channel interference and can be used to enhance system immunity to multipath fading;

(c) Digital beamforming systems are capable of performing, in the digital domain, real-time calibration of the antenna system. Thus, variations in amplitude and phase between transceivers can be corrected in real time; and (d) Digital beamforming has the potential for providing a major advantage when used in satellite communications. If, after the launch of a satellite, it is found that the satellite's capabilities or performance of the beamformer needs to be upgraded, a new suite of software can be telemetered to the satellite. Digital beamforming allows both the beam direction and shape to be changed by changing the coefficients in the multiplication operations performed by the digital signal processor. Analog beamforming fixes both direction and shape by hardware components values that are not easily changed.

Digital Beamforming in Satellite Communications

In microwave communication systems, such as those used in communication satellites, networks generate antenna beam signals. These antenna beam signals are then used to drive transmit arrays that in turn form the transmit beams that send communication signals to the intended destination.

Beamforming techniques were introduced to generate electronically steerable and reconfigurable beams. Electronic antenna steering negated many of the disadvantages of mechanical steering in which an antenna was moved mechanically by either rotating itself or the entire satellite at a slow rate. This method only allowed users in a small area to be concurrently served.

Electronic antenna steering, however, provides the ability to focus on many larger areas concurrently with high gain. By controlling the phase and amplitude of the transmit signals fed onto the components of the transmit (feeder) array, the beam direction, shape, sidelobe characteristics, and the Effective Isotropic Radiation Power (EIRP), can be manipulated to the requirement of a particular application. The EIRP, as is well known in the art, is the product of the input power to the antenna and its maximum gain.

Digital beamforming in satellite communications works naturally with digital radio systems. Typical baseband digital radios (350 and 351), shown in FIG. 3, perform bit stream formatting, coding, and modulator baseband processing in the digital domain. Digital-to-analog conversion is performed after a baseband, pulse-shaping, low-pass filter. It is a straightforward design to route the output of the low-pass filter, in digital form, to the beamforming network. This eliminates the extra digital-to-analog and analog-to-digital conversion.

FIG. 3 illustrates a block diagram of a typical prior art ground-based, digital beamforming system. The digital beamforming network is coupled to baseband digital radios.

This system is comprised of n input baseband radio signals. These input signals are to be carried on n satellite beams using the same frequency band signals. The beams, 1 - n, are formed by first formatting and coding the digital radio data. The formatting and coding required depends on the technology used in the communications system. Examples of such technologies are code division multiple access (CDMA), frequency division multiple access (FDMA), and time division multiple access (TDMA).

The bit stream from the formatting and coding block is input to the transmit symbol generator (302). This block (302) generates symbols from the bits in the stream. As in the previous block (301), the symbols used depend on the communications technology used.

The symbols are input to the baseband, pulse-shaping, low pass filter (305). After filtering (305), the signals from all the beam paths are input to the beamforming matrix (310). This block (310) generates the feed signals for the individual antenna feeds.

The feed signals from the beamforming matrix are input to the multiplexer (315) for combining into a single feeder signal. This signal is modulated (320) and amplified (325) for transmission to the satellite.

In order to control the spectrum shape of the baseband signal and reduce the degree of spectrum aliasing, the digital pulse-shaping filter is often required to work at an over-sampled rate of four to eight times over the baseband symbol rate. This high sampling rate imposes an additional processing requirement on the processing power of the digital beamforming networks. There is a previously unknown need for a method reducing the complexity of digital beamforming networks.

SUMMARY OF THE INVENTION

Both the baseband pulse-shaping low-pass filter and the beamforming network are linear systems. Therefore, linear system theory allows the order of the low-pass filters and the beamforming matrix to be exchanged without affecting the overall system properties. This enables the beamforming matrix to operate at a much lower sampling rate, thus reducing the computational demand on the digital signal processors performing the beamforming function.

The present invention encompasses a reduced rate beamforming network. The network uses a plurality of bit stream formatters to format and code digital information signals that are to be transmitted. The formatting and coding depends on the transmission technology used.

A symbol generator is coupled each formatter in order to generate I and Q symbols from the information signals. These symbols are input to the beamforming matrix that is connected directly to the plurality of symbol generators. The beamforming matrix generates baseband beam signals from the I and Q symbols.

A plurality of baseband, pulse-shaping, low-pass filters are connected to the beamforming matrix. Each of the filters is coupled to a different baseband beam signal from the beamforming matrix. The low-pass filters each generate an antenna feed signal from each of the baseband beam signals.

DETAILED DESCRIPTION OF THE PREFERRED EMBODIMENT

The present invention reduces the computational load on digital signal processors in a digital beamforming system. The beamforming network of the present invention provides a more robust and economic system by changing the order of processing within the beamforming network.

Figure 4:
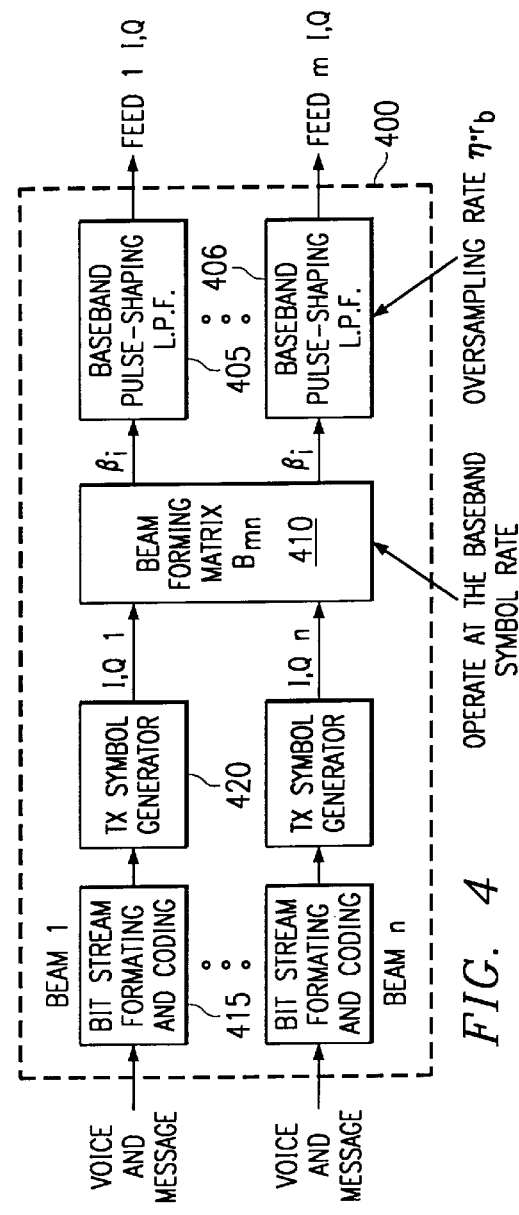
FIG. 4 shows a block diagram of the reduced rate beamforming network of the present invention.

The beamforming network (400) of the present invention is illustrated in FIG. 4. The base-band, pulse-shaping filter (405) and the beamforming matrix (410) are both linear subsystems. According to linear theory, therefore, their order of processing is not important to the overall system properties.

The digital voice or data signals are input to the beamforming network (400). There are n terminal link beams and k frequency bands in the present invention. n is directly related to the frequency reuse factor. The frequency reuse factor affects the number of simultaneous independent beams that can operate at the same frequency in the system. For clarity, only frequency band 1 will be discussed since the other beams are the same.

The digital bit stream signal is input to the formatting and coding block (415). This block is responsible for taking the unformatted bit stream and formatting and coding it according to the transmission technology used. Such technologies include CDMA, TDMA, FDMA, and GSM. The formatting and coding used are defined in the corresponding standard specification.

Other transmission technologies may also be used. All of these transmission technologies are well known in the art and are not discussed further.

The formatted and coded bit stream is input to a transmit symbol generator (420) for generation of the I and Q symbols, $(I, Q)_n$. The generation of these symbols is also well known in the art and is not discussed further.

Figure 1:
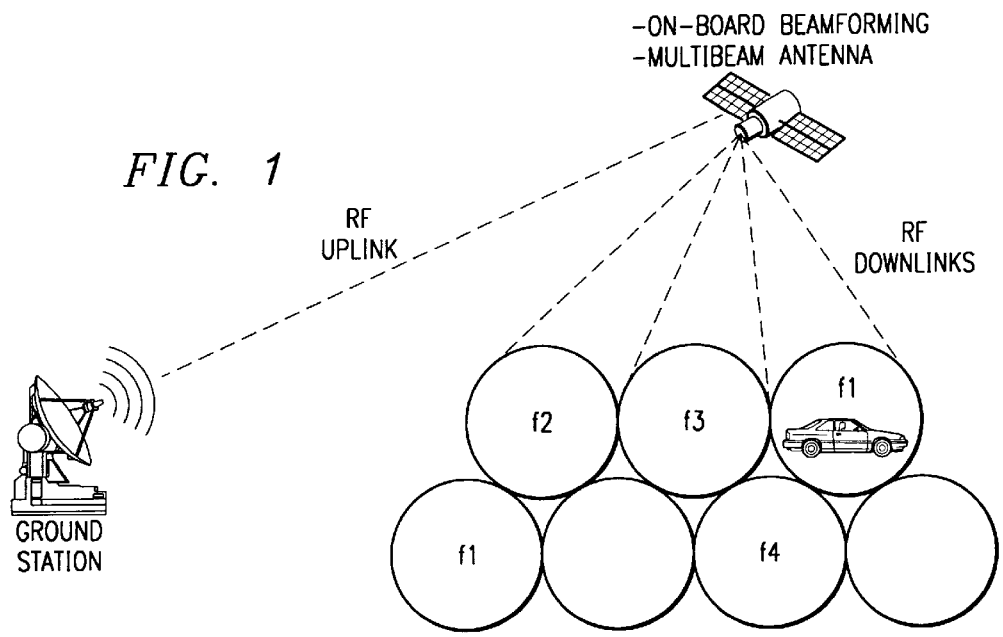
FIG. 1 shows a prior art diagram for a multi-beam communication satellite network.
Figure 6:
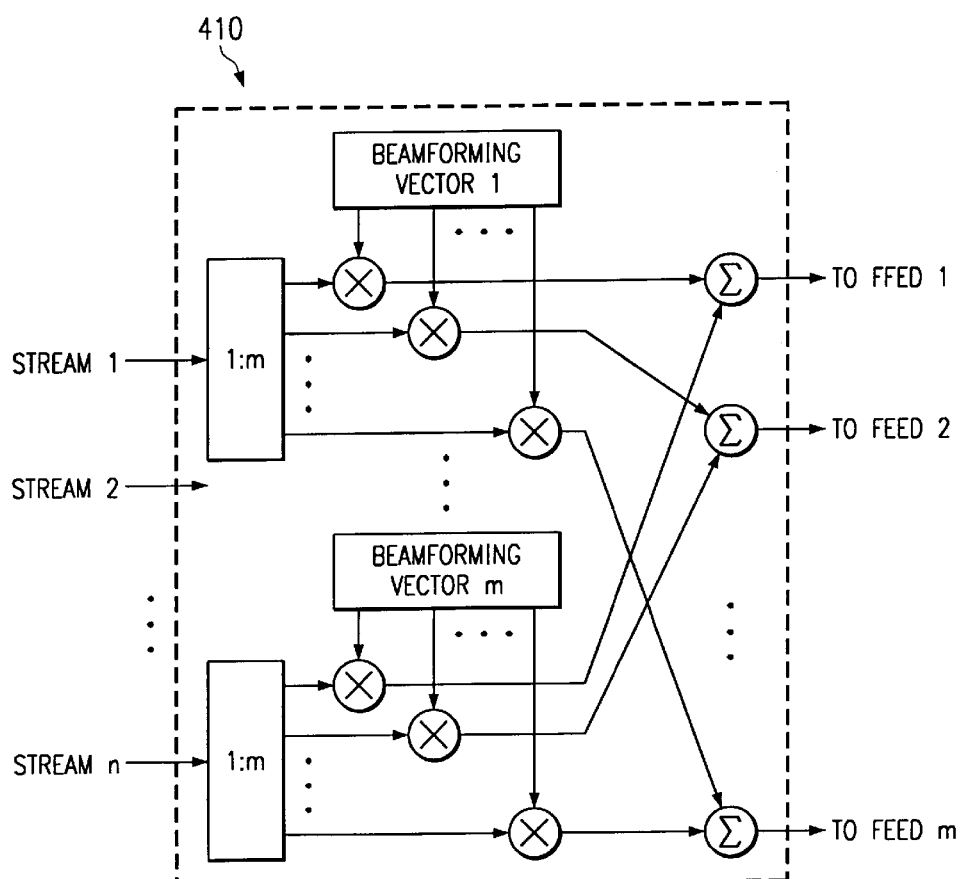
FIG. 6 shows an implementation of the beamforming matrix of FIG. 4 in a digital signal processor.
Figure 2:
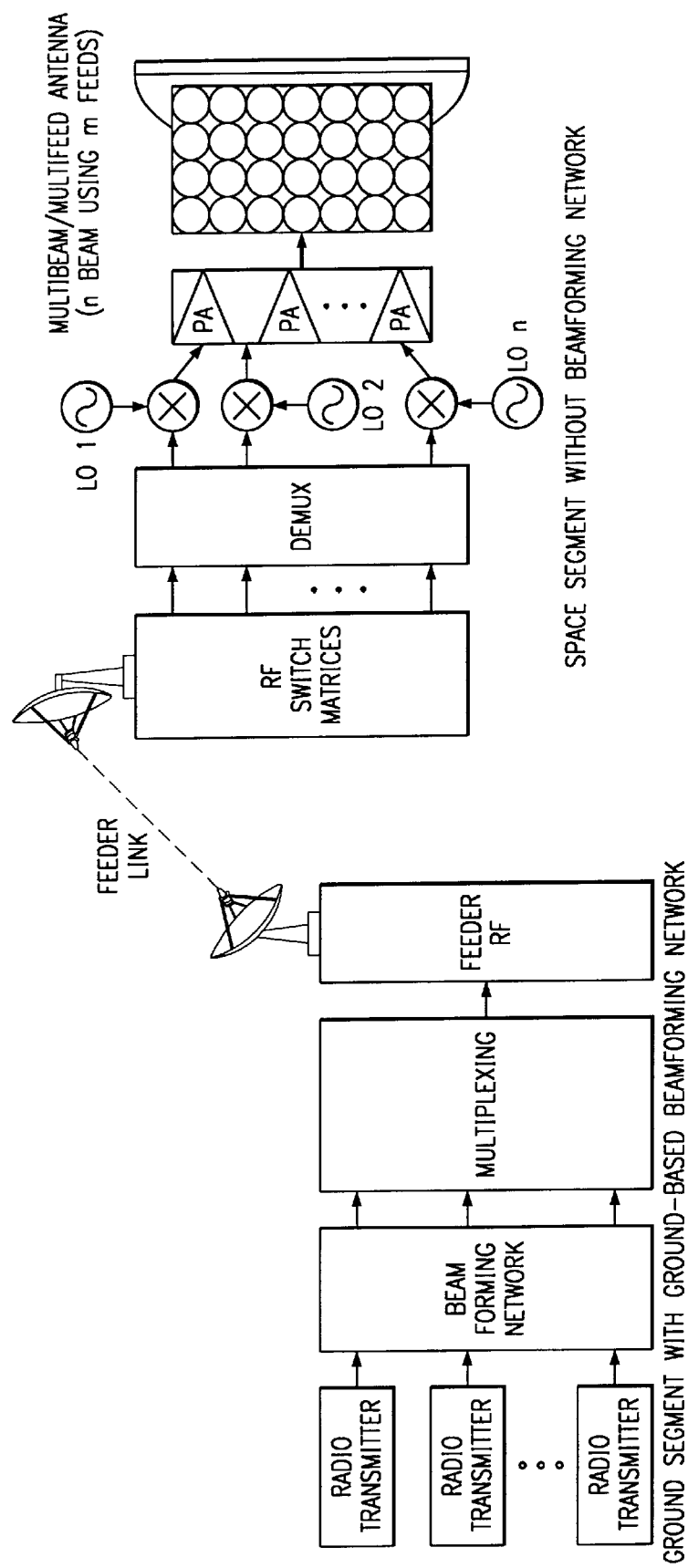
FIG. 2 shows a prior art high-level block diagram of a ground-based beamforming system.
Figure 3:
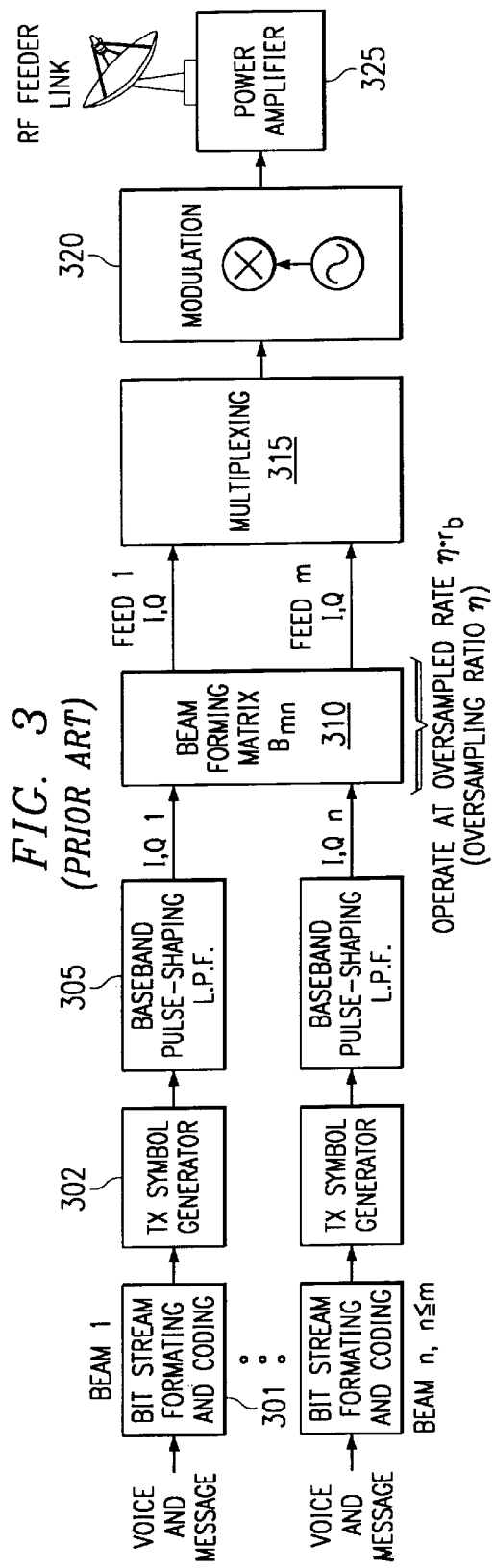
FIG. 3 shows a prior art block diagram of a ground-based digital beamforming system using digital radios.

The I and Q symbols are input to the beamforming matrix (410). FIG. 6 illustrates the implementation of the beamforming matrix processing with a digital signal processor. The beamforming column vector is denoted as $b_i$. The beamforming matrix is denoted as $B_{mn}$. The vector and matrix are:

$$b_i = \{b_{1i}, b_{2i}, \ldots, b_{mi}\}^T, i=1,2,\ldots,n \text{ and } B_{mn} = \{b_1, b_2, \ldots, b_n\}.$$

Each beamforming matrix for a specific frequency band can be determined independently based on many factors. These include the beam direction angle, feeder array geometry, and the transmitting RF frequency. Additionally, the vectors should be carefully selected such that the beams operating at the same frequency provide enough isolation in case of frequency reuse to avoid excessive co-channel interference, in accordance with frequency planning.

In the preferred embodiment, the matrix processing is conducted at the baseband symbol rate. This significantly reduces the computation load on the digital signal processor hardware compared with the processing at a much higher rate after the pulse-shaping filtering.

The output of the beamforming matrix processing is denoted as $\beta_i$. This output is coupled to the input of the pulse-shaping filters (405–406) to serve as the input impulse.

The pulse-shaping, lowpass filters (405–406) are the digital FIR filters specified in the $F_m$ and g(t) equations discussed subsequently. These filters increase the sampling rate in order to maintain the shape of the waveform and minimize aliasing. The pulse-shaping filters are the same for all feeds.

Figure 5:
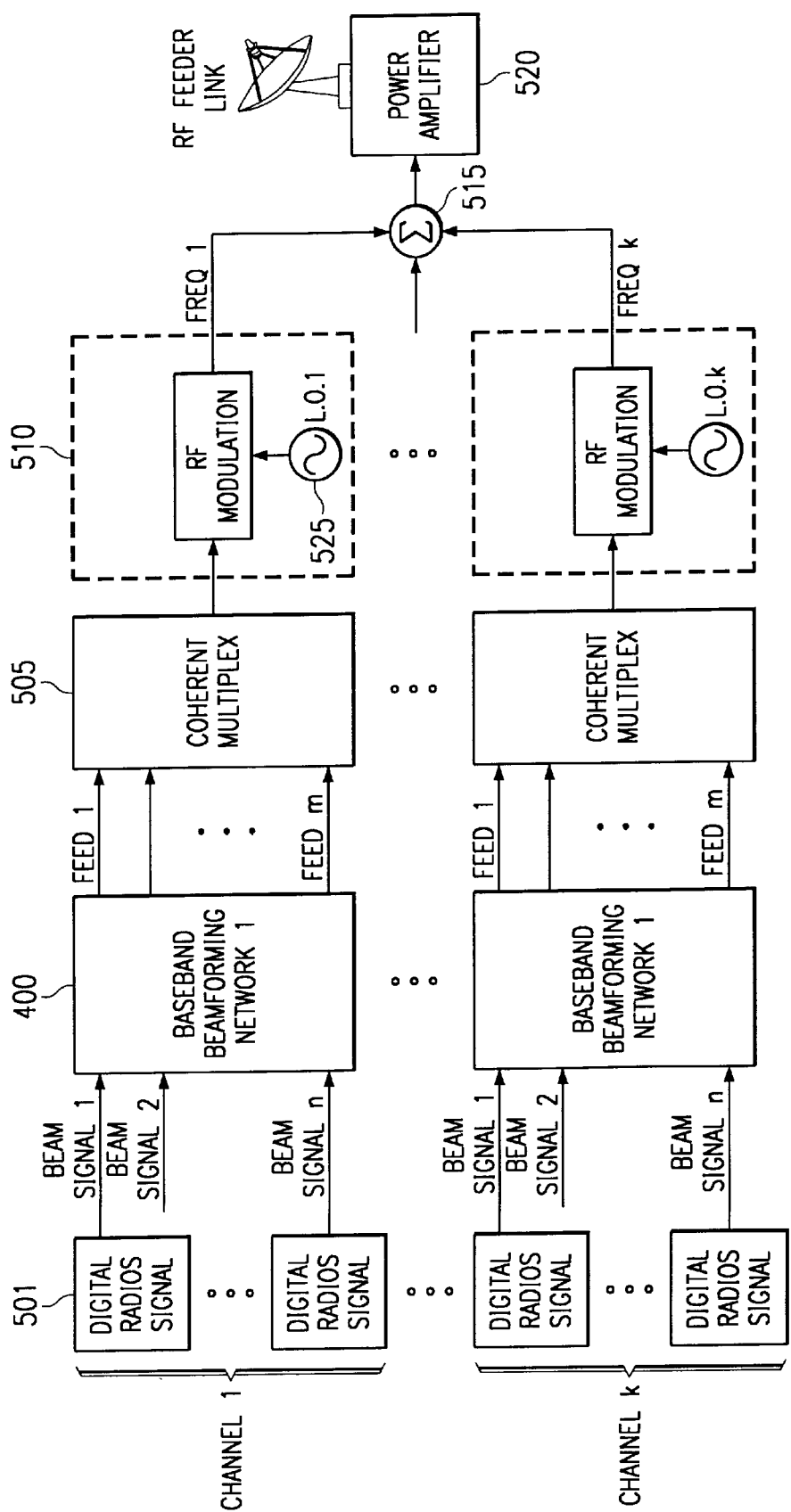
FIG. 5 shows a block diagram of a multi-frequency, multi-beamforming system in accordance with FIG. 4.

The embodiment details of FIG. 5 also depend on the digital radio system's RF modulation scheme. A GSM radio (501) ground beamforming network is presented in FIG. 5 for illustration purposes. Other types of radios may also be used in other embodiments. The particular specifications are defined in associated standards and are well known in the art and not discussed here.

The linear pulse-shaping digital filter is defined by:

$$g(t) = h(t) * rect\left(\frac{t}{T}\right)$$

where $rect\left(\frac{t}{T}\right) = \frac{1}{t}$, for $|t| < \frac{T}{2}$ and $rect\left(\frac{t}{T}\right) = 0$ otherwise.

h(t) is defined by:

$$h(t) = \frac{e^{\left(\frac{-t^2}{2\sigma^2 T^2}\right)}}{\sigma T \sqrt{2\pi}}, \text{ where } \sigma = \frac{\sqrt{\ln(2)}}{2\pi BT}, \text{ and } BT = 0.3$$

where B is the 3 dB bandwidth of the filter with impulse response h(t) and T is the duration of one input data bit.

To increase the processing speed to satisfy the real-time requirement, the filters are implemented using fixed-point techniques. The word length depends on the precision requirement of the phase and amplitude of the beamforming signals. The output of the pulse-shaping filtering is still in digital form, although at a higher sample rate than the input.

FIG. 5 illustrates a use of the baseband beamforming network of FIG. 4. The multi-frequency, multi-beamforming network of FIG. 5 is comprised of k channels with each channel having n input signals and m feeds. In this example, k is limited by the RF bandwidth of each RF channel that depends on the particular technology used and the total RF bandwidth that is allocated for the system.

The processing channels for the different frequencies are exactly the same. Therefore, for clarity, the subsequent description is based on only one of the channels.

The GSM radio transmitters (501) use the Gaussian Minimum Shift Keying modulation scheme. The digital symbol rate is 270.833 kbps and the RF channel spacing is 200 kHz. The beam signal from the radio transmitter (501) is input to the baseband beamforming network (400)

The responsibility of the baseband beamforming network (400), including both the ground and space segments, is to precisely rotate the phase and modify the amplitude of the input signals so that they will produce expected beam pattern when they reach the feed elements over the antenna on the satellite. These precise phase relationships between signals must be preserved at the satellite feeds. The baseband beamforming network (400) of FIG. 5 is illustrated and discussed above in FIGS. 4 and 6.

The m feeds from the baseband beamforming network (400) are input to the coherent multiplexer (505). The multiplexer (505) combines all of the feeds into one signal. This multiplexed signal is input to the RF modulator (510) that modulates the signal to the designated feeder link with an appropriate offset frequency, as determined by the modulator's local oscillator (525).

The modulated signals from all of the separate channels are input to the summer (515). The summer (515) adds all of the channels for transmission. The summed signal is input to the power amplifier (520) for adjustment of the transmit power before transmission to the satellite.

The benefits of the present invention are illustrated by the following computational complexity comparison. The number of operations per second of both the prior art beamforming system and the present invention are considered.

For the prior art system, the input radio symbol vector is defined as $R_n$, the baseband symbol rate is $r_b$, the oversampling ratio is n, and the beamforming matrix is $B_{mn}$. In this case, m is the number of feeds and n is the number of radios (beams). The number of radios is affected by the frequency reuse.

The vector $F_m$ represents the output of the beamforming matrix operation. The vectors are coupled to either the multiplexer or the pulse-shaping, lowpass filter bank, depending on the implementation. The beamforming matrix processing is represented as the matrix equation below. The matrix elements $b_{ij}$ are generally of complex values.

$$B_{mn} \cdot R_n = \begin{bmatrix} b_{11} & \ldots & b_{1n} \\ \ldots & b_{ij} & \ldots \\ b_{m1} & \ldots & b_{mn} \end{bmatrix} \begin{bmatrix} r_1 \\ \vdots \\ r_n \end{bmatrix} = \begin{bmatrix} f_1 \\ \vdots \\ f_m \end{bmatrix} = F_m$$

A simple calculation gives the total required complex operations per second, including multiplication and additions, for the prior art beamforming processing as:

$r_b \times \eta \times (n \times m + n \times (m-1))$.

For the system of the present invention, the computation requirement becomes:

$\frac{1}{2} \times r_b \times (n \times m + n \times (m-1))$.

The factor $\eta$ disappeared due to the beamforming processing being carried out at the baseband symbol rate. The saving factor of ½ results from the baseband signal being in real form.

It can be seen that the net savings on a digital signal processor's computational load are a factor of $2\eta$. For $\eta=(4$ to $8)$, the savings is approximately an order of magnitude and is very significant when the system is operating at the high edge of digital signal processing devices. The resulting design of the present invention, therefore, provides a more robust and economic system with less demanding digital signal processor hardware.

We claim:

1. A reduced rate beamforming network comprising:
    a plurality of digital input signals that represent voice or data messages;
    a plurality of bit stream formatters, each bit stream formatter coupled to one of the plurality of digital input signals to generate a predetermined format signal;
    a plurality of symbol generators, each symbol generator coupled to one of the plurality of bit stream formatters, each symbol generator transforming the predetermined format signal into a series of symbols;
    a beamforming matrix connected directly to the plurality of symbol generators, the beamforming matrix generating a plurality of baseband beam signals from the plurality of series of symbols; and
    a plurality of baseband low-pass filters coupled to the beamforming matrix, each of the filters coupled to a different baseband beam signal of the plurality of baseband beam signals, the low-pass filters generating a plurality of antenna feed signals from the plurality of baseband beams signals.

2. A ground-based, satellite beamforming system comprising:
    a plurality of baseband digital radios for generating baseband, digital information signals;
    a baseband beamforming network comprising:
        a plurality of bit stream formatters, each bit stream formatter coupled to one of the plurality of digital information signals to generate a predetermined format signal;
        a plurality of symbol generators, each symbol generator coupled to one of the plurality of bit stream formatters, each symbol generator transforming the predetermined format signal into a series of symbols;
        a beamforming matrix connected directly to the plurality of symbol generators, the beamforming matrix generating a plurality of baseband beam signals from the plurality of series of symbols; and
        a plurality of baseband low-pass filters coupled to the beamforming matrix, each of the filters coupled to a different baseband beam signal of the plurality of baseband beam signals, the low-pass filters generating a plurality of antenna feed signals from the plurality of baseband beams signals;
    a plurality of coherent multiplexers, each multiplexer coupled to a different baseband beamforming network, each multiplexer combining the plurality of antenna feed signals from the coupled baseband beamforming network into a multiplexed signal;
    a plurality of radio frequency modulators, each modulator coupled to a different coherent multiplexer, the modulators modulating each multiplexed signal to a predetermined frequency to produce a modulated signal; and
    a radio frequency front end coupled to the radio frequency modulator, the radio frequency front end producing a radio frequency feeder signal from the plurality of modulated signals.

3. A method for performing baseband beamforming in a multi-frequency, multi-beam, beamforming network, the method comprising the steps of:

formatting a plurality of digital signal bit streams to generate a plurality of predetermined digital format signals;

generating a series of symbols, at a baseband frequency, from each of the predetermined format signals;

generating antenna feed signals from each of the plurality of series of symbols; and generating filtered antenna feed signals from the antenna feed signals by pulse-shaping and low-pass filtering the antenna feed signals.

* * * * *